(No Model.)
J. H. WALL.
DASHBOARD FOR VEHICLES.
No. 561,365. Patented June 2, 1896.
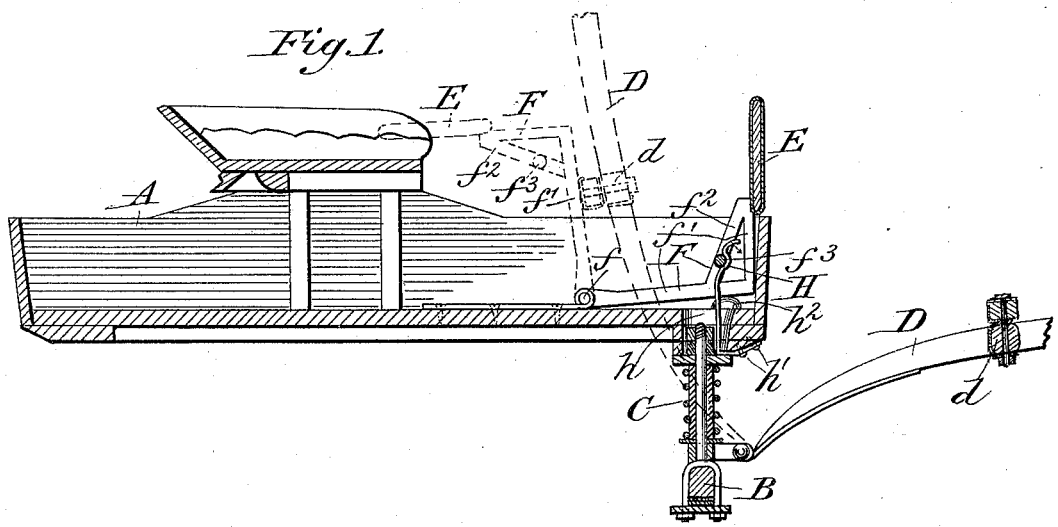
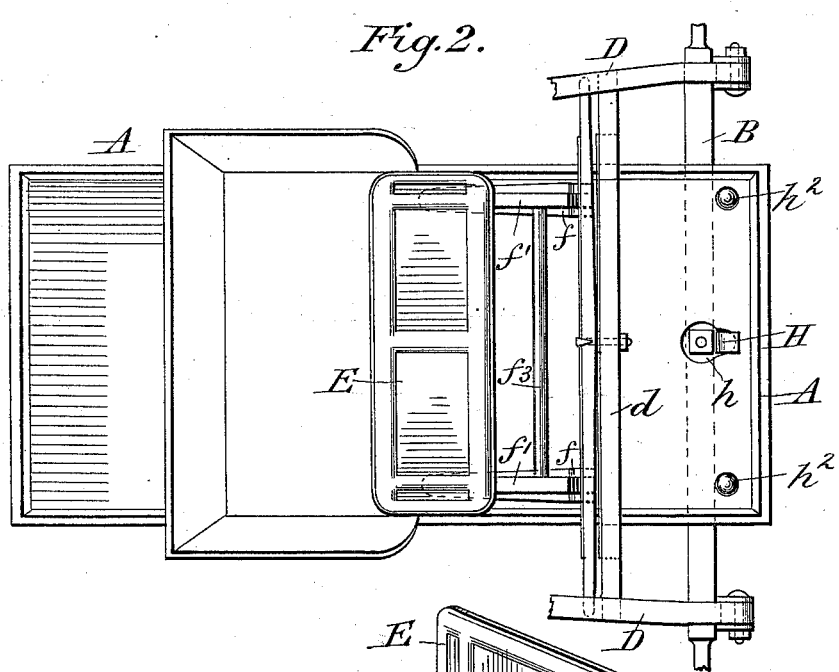
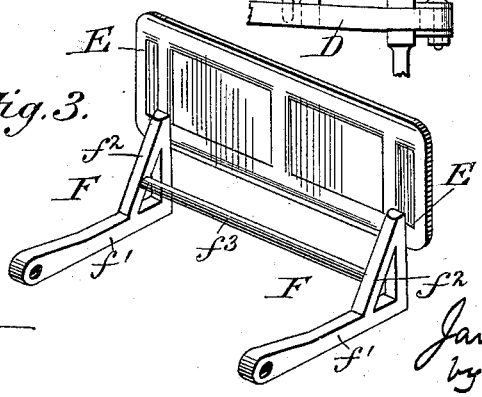
Attest:
F. H. Schott
H. D. Finckel
Inventor.
James H. Wall
by Grant Burroughs
atty.

United States Patent Office.

JAMES H. WALL, OF NEW YORK, N. Y.

DASHBOARD FOR VEHICLES.

SPECIFICATION forming part of Letters Patent No. 561,365, dated June 2, 1896.

Application filed March 10, 1896. Serial No. 582,554. (No model.)

*To all whom it may concern:*

Be it known that I, JAMES H. WALL, a citizen of the United States, residing at New York, in the county and State of New York, have invented certain new and useful Improvements in Dashboards for Vehicles, of which the following is a full, clear, and exact description, such as will enable those skilled in the art to which it appertains to make and use the same, reference being had to the accompanying drawings, which form a part of this specification.

This invention relates to improvements in dashboards for vehicles.

It has for its object the provision of a connection between the dashboard and the body of the vehicle whereby the former can be moved from its normal position, so that the thills can be raised and turned back so as to be directly over the body.

The invention consists in the novel construction, combination, and arrangement of parts, such as will be hereinafter fully described, pointed out in the appended claims, and illustrated in the accompanying drawings.

In the accompanying drawings, in which similar letters of reference designate corresponding parts, Figure 1 is a sectional view of a vehicle embodying the invention. Fig. 2 is a plan view of the same. Fig. 3 is a detail perspective view showing the dashboard and the angle-irons on which it is mounted.

Referring to the drawings by letter, A designates the body of a vehicle; B, the front axle; C, the mechanism intermediate of the axle and the body, and D the thills. These several parts may be of any construction suitable in the premises, provided that the thills can be turned back so that the cross-bar $d$ of the same will clear the forward end of the body. A dashboard E is hinged in the forward end of the body in such a manner that it can be turned back from its normal position to allow a free passage of the cross-bar $d$ of the thills over the forward end of the body. The dashboard is supported by the angle-irons F F. Each of the latter is attached at its rear end to the floor by a hinge $f'$. In the angle formed by the limbs $f'$ $f'$ is mounted a brace $f^2$, which serves to bind the limbs in their proper relative positions. Extending between the braces $f^2$ $f^2$, and attached at its ends to them, is the rod $f^3$, which serves as a brace and also as a foot-rest.

A spring-catch H is provided, which is adapted to engage with the rod $f^3$ and thereby secure the dashboard against accidental displacement. It is preferably mounted in the hole $h$, formed for the reception of the kingbolt. In the present instance the spring is secured by having its lower end bent and secured to the under side of the body by the screws $h'$ $h'$.

In the bottom of the body rubber buffers $h^2$ $h^2$ are mounted. On these the angle-irons F F rest and are thereby prevented from rattling. It is also to be observed that the whiffletree and the cross-bar $d$ are provided with leather sheathing to guard against the abrasion of the parts of the body with which they come in contact when the thills are turned back.

The operation of the device is as follows: When it is desired to turn the thills back, the dashboard is released by pressing on the end of the spring-catch H, which projects above the cross-rod $f^3$. This releases the catch from the cross-rod. The dashboard is then turned back until its upper edge rests on the floor, or on the seat, as in this case. By reason of the construction of the angle-irons and their hinge connection with the floor this turning of the dashboard will place the latter at a considerable distance from the front board of the body. The thills can then be turned back, as shown in Fig. 1, directly over the body.

Having thus described my invention, what I claim, and desire to secure by Letters Patent, is—

1. In a vehicle, the combination of a body and a dashboard hinged thereto so that the latter can be turned back and away from the front board of the body.

2. In a vehicle, the combination of a body, a dashboard, and angle-irons hinged to said body and secured to said dashboard so that the latter can be turned back and away from the front board of the body.

3. In a vehicle, the combination of a body, a dashboard, angle-irons hinged to said body and secured to said dashboard so that the latter can be turned back and away from the front board of the body, and a catch for securing said dashboard in its forward position against accidental displacement.

4. In a vehicle, the combination of a body, a dashboard, angle-irons hinged to said body and secured to said dashboard so that the latter can be turned back and away from the front board of the body, a rod connecting the angle-irons, and a catch adapted to engage with said rod to secure said dashboard in its forward position against accidental displacement.

5. In a vehicle, the combination of a body, a dashboard, angle-irons hinged to said body and secured to said dashboard so that the latter can be turned back and away from the front board of the body, braces fixed in the angles of said irons, and a rod connecting said braces.

In testimony whereof I hereunto affix my signature in the presence of two witnesses.

JAMES H. WALL. [L. S.]

Witnesses:
   FRANK CORSA, [L. S.]
   WILLIAM H. WITHERSPOON. [L. S.]